United States Patent
Chen (10) Patent No.: US 10,274,747 B1
(45) Date of Patent: Apr. 30, 2019

(54) GLASSES NOSE PAD ADJUSTMENT STRUCTURE

(71) Applicant: Lin Yun Chen, Tainan (TW)

(72) Inventor: Lin Yun Chen, Tainan (TW)

(*) Notice: Subject to any disclaimer, the term of this patent is extended or adjusted under 35 U.S.C. 154(b) by 0 days.

(21) Appl. No.: 15/798,382

(22) Filed: Oct. 30, 2017

(51) Int. Cl.
*G02C 5/12* (2006.01)

(52) U.S. Cl.
CPC ......... *G02C 5/124* (2013.01); *G02C 2200/18* (2013.01)

(58) Field of Classification Search
CPC ............. G02C 5/02; G02C 5/122; G02C 5/12
USPC .............................. 351/138, 137, 136, 80, 78
See application file for complete search history.

(56) References Cited

U.S. PATENT DOCUMENTS

| | | | | |
|---|---|---|---|---|
| 4,997,267 A | * | 3/1991 | Morrison ................. | G02C 5/12 351/128 |
| 5,257,050 A | * | 10/1993 | Wiedner ................. | A61F 9/025 351/138 |
| 7,380,934 B1 | * | 6/2008 | Wang Lee ............. | G02C 5/122 351/136 |
| 7,497,570 B2 | * | 3/2009 | Cohen .................... | G02C 5/122 351/137 |
| 7,524,055 B2 | * | 4/2009 | Schepke ................. | G02C 1/04 351/103 |
| 8,931,894 B1 | * | 1/2015 | Chen ........................ | G02C 1/10 351/103 |

* cited by examiner

*Primary Examiner* — Hung X Dang
(74) *Attorney, Agent, or Firm* — Bruce Stone LLP; Joseph Bruce (57) ABSTRACT

Provided is a glasses nose pad adjustment structure, including a frame and a nose pad. The frame includes a lens fixing part and a plurality of pairs of nose fastening holes. The nose pad includes a pair of fixed shafts and at least one lens slot. The pair of fixed shafts of the nose pad is selectively fixed to one of the plurality of pairs of nose fastening holes.

6 Claims, 9 Drawing Sheets

GLASSES NOSE PAD ADJUSTMENT STRUCTURE

BACKGROUND OF THE INVENTION

1. Field of the Invention

The present disclosure relates to a pair of glasses, and particularly relates to a nose pad adjustment structure of a pair of glasses.

2. The Prior Arts

With the continuous progress of technology, glasses in technology and application materials have been a lot of breakthroughs, in recent years, more and more people wear glasses at work or in sports. Moreover, the main purpose of wearing glasses is to protect the eyes and to shield the sun.

Nose pads in the glasses are plastic pads used to allow a comfortable resting of the eye wires on the nose. Accordingly, the nose pads can maintain a distance between the lenses and the glasses wearer's eyes.

However, when a glasses wearer is exercising or working, for example, the glasses wearer (wearing sunglasses, general glasses or prescription glasses) is riding a bicycle, riding a motorbike or driving a car, the glasses wearer's body is tilted forward, so that the glasses wearer's eyes and the glasses cannot maintain an appropriate distance, and thus causing the glasses wearer not to have a clear vision.

Therefore, except for nose types that can be applied to a variety of glasses wearers, the glasses allows the glasses wearer to have a clear vision and to have the effect of shielding the sun when riding a bicycle, riding a motorbike or driving a car. Accordingly, how to provide a better glasses nose pad adjustment structure is indeed one of the important issues.

SUMMARY OF THE INVENTION

In order to achieve the above objective, according to one preferred embodiment, the present disclosure provides a glasses nose pad adjustment structure, including a frame, having a lens fixing part and a plurality of pairs of nose fastening holes; and a nose pad, having a pair of fixed shafts and at least one lens slot, wherein the pair of fixed shafts of the nose pad is selectively fixed to one of the plurality of pairs of nose fastening holes.

Preferably, the present disclosure further includes a lens, provided between the lens fixing part and the at least one lens slot.

Preferably, the lens fixing part is a groove, and one side of the lens is provided in the groove.

Preferably, the lens fixing part is a insertion hole, the lens is provided with an insertion part, and the insertion part is provided in the insertion hole.

Preferably, the lens fixing part is a groove, the groove is provided with an insertion hole, one side of the lens is provided in the groove, the lens is further provided with an insertion part which is provided in the insertion hole.

Preferably, a wearer adjusts the height of the nose pad by the plurality of pairs of nose fastening holes and the pair of fixed shafts of the nose pad according to the demand.

DETAILED DESCRIPTION OF THE PREFERRED EMBODIMENT

The detailed description of the present disclosure is provided in combination with the accompanying drawings.

Figure 1:
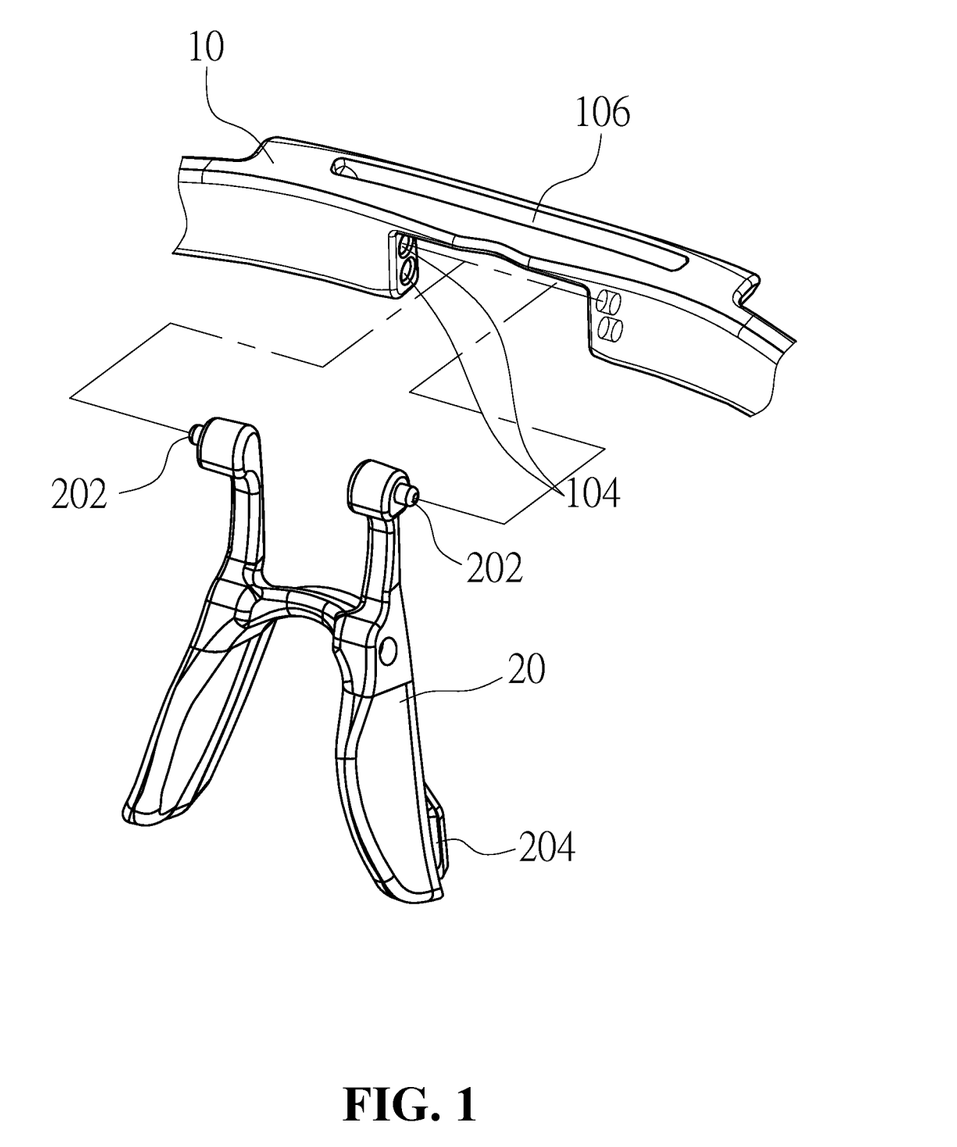
FIG. 1 shows a three-dimensional decomposition diagram of a glasses nose pad adjustment structure having a frame and a nose pad in accordance with a preferred embodiment of the present disclosure.
Figure 2:
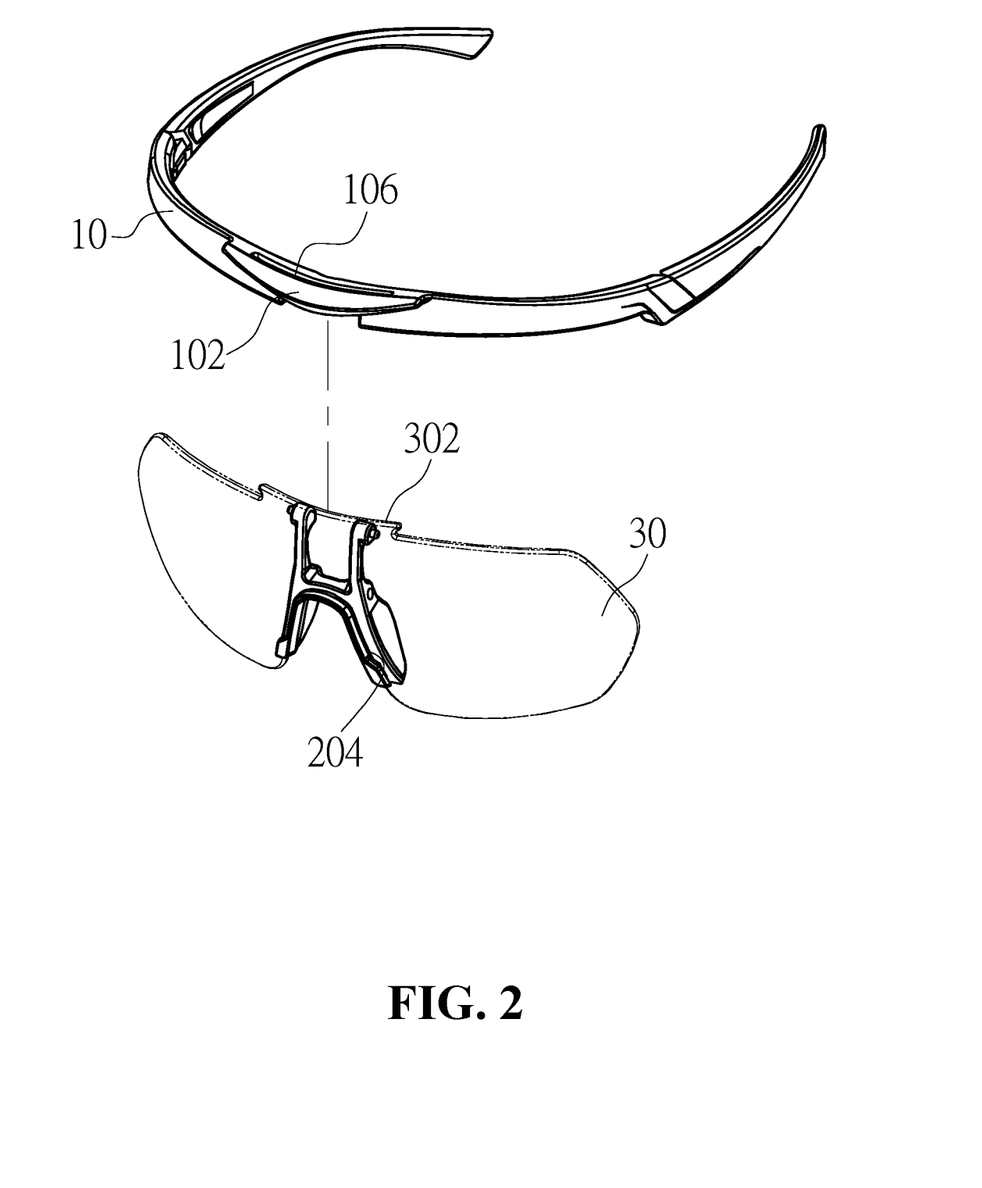
FIG. 2 shows a three-dimensional decomposition diagram of the glasses nose pad adjustment structure in accordance with the preferred embodiment of the present disclosure.
Figure 3:
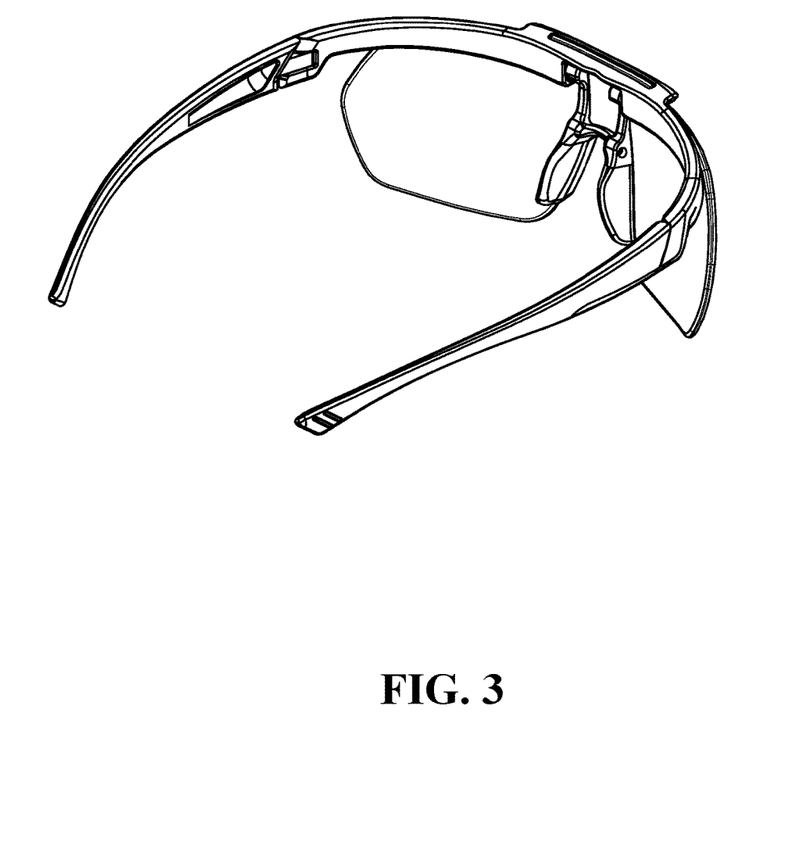
FIG. 3 shows a three-dimensional diagram of the glasses nose pad adjustment structure in accordance with the preferred embodiment of the present disclosure.
Figure 4:
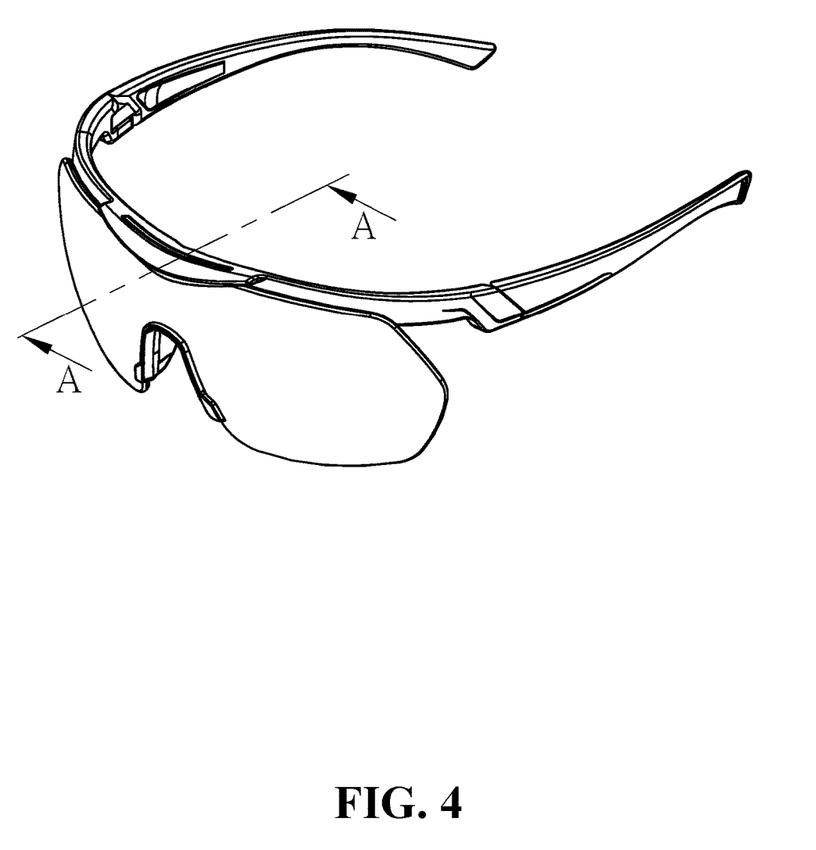
FIG. 4 shows a three-dimensional diagram of the glasses nose pad adjustment structure (including lines A-A) in accordance with the preferred embodiment of the present disclosure.

According to a preferred embodiment of the present disclosure, FIG. 1 shows a three-dimensional decomposition diagram of a glasses nose pad adjustment structure having a frame 10 and a nose pad 20; FIG. 2 shows a three-dimensional decomposition diagram of the glasses nose pad adjustment structure; FIG. 3 shows a three-dimensional diagram of the glasses nose pad adjustment structure; and FIG. 4 shows a three-dimensional diagram of the glasses nose pad adjustment structure (including lines A-A). As shown in FIG. 1, the glasses nose pad adjustment structure of the present disclosure includes a frame 10 and a nose pad 20.

As shown in FIG. 1 and FIG. 2, the frame 10 of the present disclosure includes a lens fixing part 102 and a plurality of pairs of nose fastening holes 104. Moreover, the nose pad 20 of the present disclosure includes a pair of fixed shafts 202 and at least one lens slot 204. The pair of fixed shafts 202 of the nose pad 20 is fixed to one of the plurality of pairs of nose fastening holes 104. In addition, the present disclosure further includes a lens 30. The lens 30 is provided between the lens fixing part and the at least one lens slot. Furthermore, the present disclosure further includes a lens insertion hole 106. The lens 30 having an insertion part 302 is inserted into the lens insertion hole 106 of the frame 10 to be positioned. Subsequently, the lens 30 may be embedded in at least one lens slot 204 of the nose pad 20, thereby making the lens 30 more secure and less likely to fall off. It is to be noted that the frame 10 of the present disclosure is a half frame, but the frame 10 of the present disclosure may also be a full frame.

As shown in FIG. 2, the lens fixing part 102 of the present disclosure may be a groove, and one side of the lens 30 may be provided in the groove. Moreover, the lens fixing part 102 of the present disclosure may also be an insertion hole, the lens 30 may be provided with an insertion part 302, and the insertion part 302 may be provided in the insertion hole. In addition, the lens fixing part 102 of the present disclosure may also be a groove. The groove may be provided with an insertion hole. One side of the lens 30 may be provided in the groove. The lens 30 may further provided with an insertion part 302. The insertion part 302 may be provided in the insertion hole.

Figure 5:
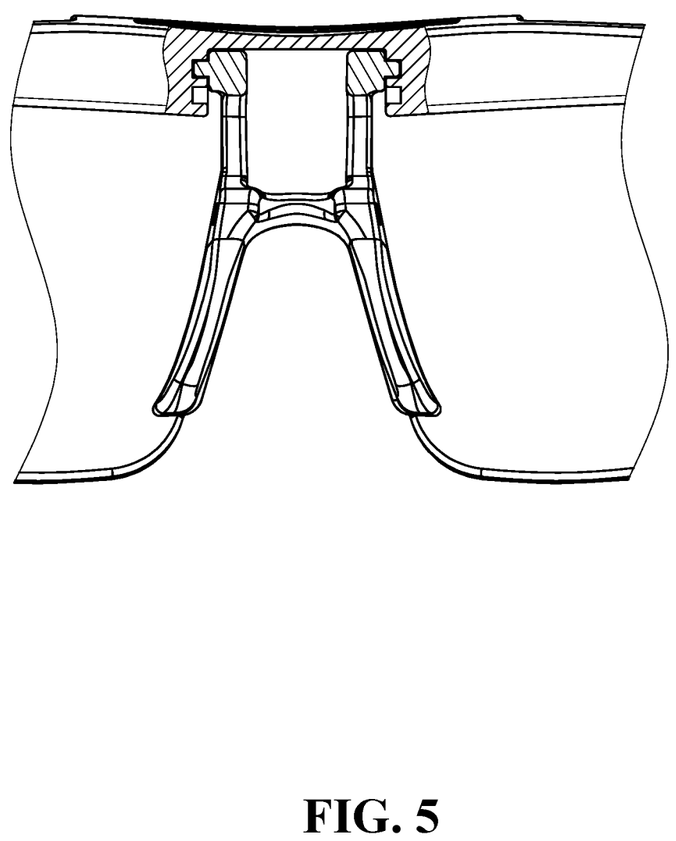
FIG. 5 shows a front view of the glasses nose pad adjustment structure adjusting the height of a nose pad in accordance with one example of the present disclosure.
Figure 6:
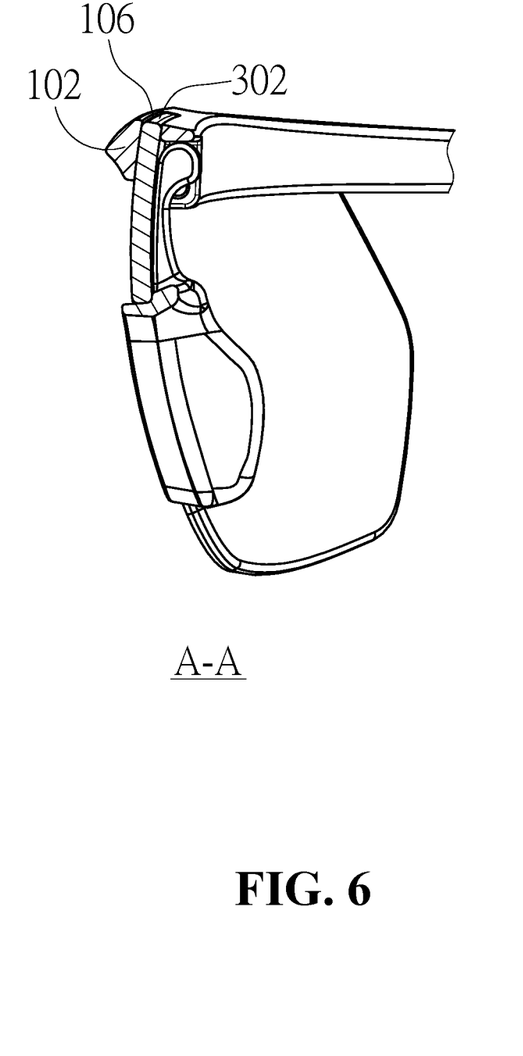
FIG. 6 shows a cross-sectional view taken along lines A-A of FIG. 4 accordance with one example of the present disclosure.
Figure 7:
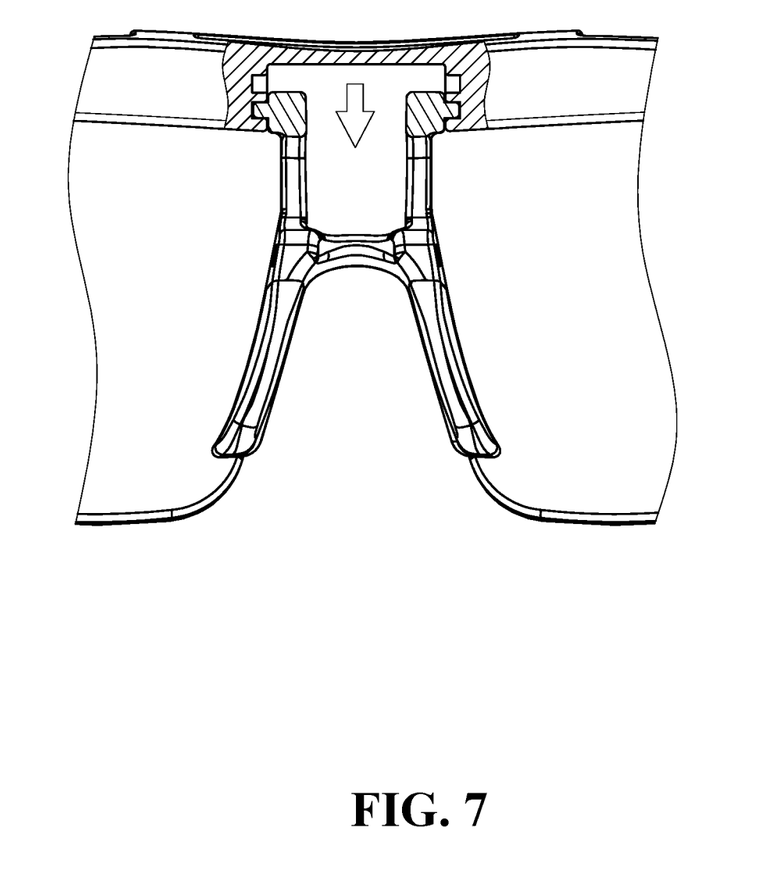
FIG. 7 shows a front view of the glasses nose pad adjustment structure adjusting the height of a nose pad in accordance with another example of the present disclosure.
Figure 8:
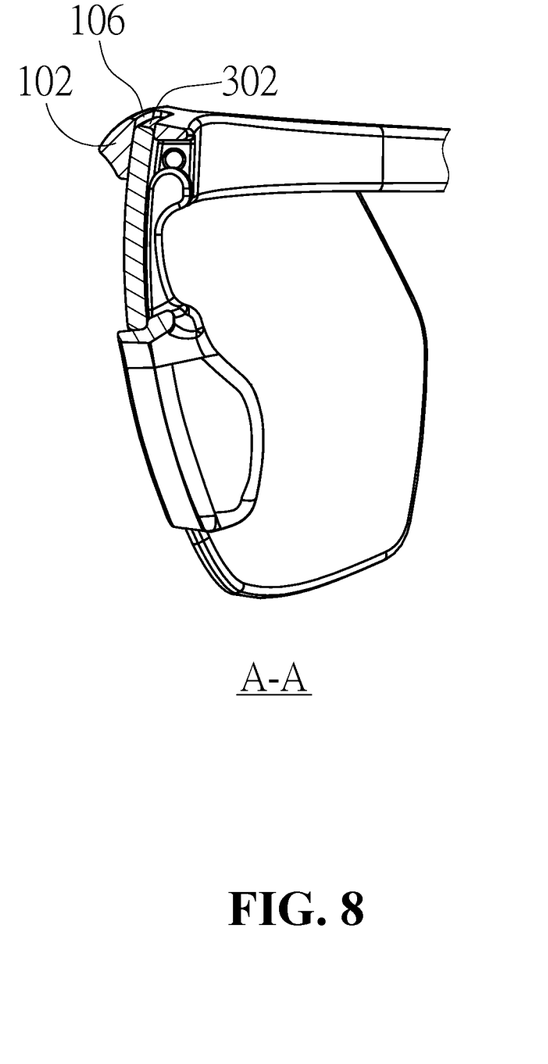
FIG. 8 shows a cross-sectional view taken along lines AA of FIG. 4 in accordance with another example of the present disclosure.

According to one example of the present disclosure, FIG. 5 shows a front view of the glasses nose pad adjustment structure adjusting the height of a nose pad; and FIG. 6 shows a cross-sectional view taken along lines A-A of FIG. 4. According to another example of the present disclosure, FIG. 7 shows a front view of the glasses nose pad adjustment structure adjusting the height of a nose pad; and FIG. 8 shows a cross-sectional view taken along lines AA of FIG. 4. Specifically, as shown in FIGS. 5-8, the pair of fixed shafts 202 of the nose pad 20 is pressed so as to enable the pair of fixed shafts 202 to be adjusted and to be fixed to one of the plurality of pairs of nose fastening holes 104. Therefore, the nose pad adjustment structure of the present disclosure can effectively achieve the effect of easily adjusting the height of the nose pad 20.

Figure 9:
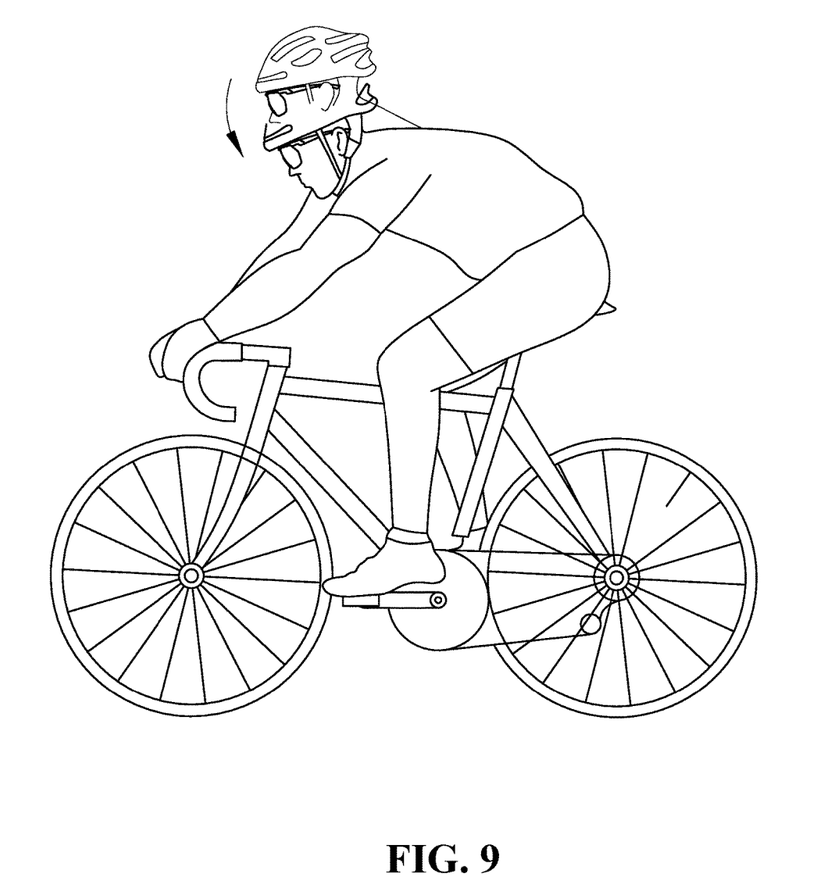
FIG. 9 shows a schematic diagram of the glasses nose pad adjustment structure adjusting the height of a nose pad in accordance with the preferred embodiment of the present disclosure.

As shown in FIG. 9, when the glasses wearer is riding the bicycle and the glasses wearer's body is tilted forward, the nose pad can be effectively adjusted to an appropriate height position by the nose pad adjustment structure of the present disclosure, so that the glasses wearer still has a clear vision when riding a bicycle. In addition, the glasses wearer can effectively solve the problem of different eye level without the need to replace different size of glasses or to replace different lenses.

In summary, according to the glasses nose pad adjustment structure of the present disclosure, the present disclosure has the following advantages. The glasses nose pad adjustment structure of the present disclosure does not produce uncomfortable feeling at the time of wearing, is easy to assemble and is not easy to cause damage. Moreover, the nose pad adjustment structure of the present disclosure allows a glasses wearer to have a clear vision when riding a bicycle, riding a motorbike or driving, while having the effect of shielding the sun, so that the glasses wearer's eyes feel more comfortable.

Although the present disclosure has been described with reference to the preferred exemplary preferred embodiments thereof, it is apparent to those skilled in the art that a variety of modifications and changes may be made without departing from the scope of the present disclosure which is intended to be defined by the appended claims.

What is claimed is:

1. A glasses nose pad adjustment structure, comprising:
 a frame, having a lens fixing part and a plurality of pairs of nose fastening holes; and
 a nose pad, having a pair of fixed shafts and at least one lens slot, wherein the pair of fixed shafts is directly fixed on both sides of the nose pad, and the pair of fixed shafts of the nose pad is selectively fixed to one of the plurality of pairs of nose fastening holes.

2. The glasses nose pad adjustment structure of claim 1, further comprising:
 a lens, provided between the lens fixing part and the at least one lens slot.

3. The glasses nose pad adjustment structure of claim 2, wherein the lens fixing part is a groove, and one side of the lens is provided in the groove.

4. The glasses nose pad adjustment structure of claim 2, wherein the lens fixing part is an insertion hole, the lens is provided with an insertion part, and the insertion part is provided in the insertion hole.

5. The glasses nose pad adjustment structure of claim 2, wherein the lens fixing part is a groove, the groove is provided with an insertion hole, one side of the lens is provided in the groove, the lens is further provided with an insertion part which is provided in the insertion hole.

6. The glasses nose pad adjustment structure of claim 1, wherein a glasses wearer adjusts the height of the nose pad by the plurality of pairs of nose fastening holes and the pair of fixed shafts of the nose pad according to the demand.

* * * * *